United States Patent
Auler et al.

(10) Patent No.: US 11,191,265 B2
(45) Date of Patent: Dec. 7, 2021

(54) METHOD OF REDUCING CROP DAMAGE

(71) Applicant: Bayer CropScience Aktiengesellschaft, Monheim am Rhein (DE)

(72) Inventors: Thomas Auler, Bergisch Gladbach (DE); Jan Dittgen, Frankfurt (DE); Herve Tossens, Verlaine (BE)

(73) Assignee: Bayer CropScience Aktiengesellschaft, Monheim am Rhein (DE)

( * ) Notice: Subject to any disclaimer, the term of this patent is extended or adjusted under 35 U.S.C. 154(b) by 464 days.

(21) Appl. No.: 16/328,313

(22) PCT Filed: Aug. 28, 2017

(86) PCT No.: PCT/EP2017/071512
§ 371 (c)(1),
(2) Date: Feb. 26, 2019

(87) PCT Pub. No.: WO2018/041762
PCT Pub. Date: Mar. 8, 2018

(65) Prior Publication Data
US 2021/0289777 A1    Sep. 23, 2021

(30) Foreign Application Priority Data

Aug. 30, 2016 (EP) .................................. 16186376
Dec. 21, 2016 (EP) .................................. 16205637

(51) Int. Cl.
*A01N 25/32* (2006.01)
*A01N 43/56* (2006.01)
*A01N 43/80* (2006.01)

(52) U.S. Cl.
CPC ............. *A01N 25/32* (2013.01); *A01N 43/56* (2013.01); *A01N 43/80* (2013.01)

(58) Field of Classification Search
CPC ......... A01N 25/32; A01N 43/56; A01N 43/80
See application file for complete search history.

(56) References Cited

U.S. PATENT DOCUMENTS

| | | | |
|---|---|---|---|
| 4,405,357 | A | 9/1983 | Chang |
| 5,395,816 | A | 3/1995 | Ensminger |
| 2005/0009702 | A1 | 1/2005 | Keifer |
| 2007/0021303 | A1 | 1/2007 | Rosinger et al. |
| 2008/0269052 | A1 | 10/2008 | Rosinger et al. |
| 2019/0008153 | A1 | 1/2019 | Tossens et al. |

FOREIGN PATENT DOCUMENTS

| | | |
|---|---|---|
| WO | 2012/148689 A2 | 11/2012 |
| WO | 2015/127259 A1 | 8/2015 |
| WO | 2017/025418 A1 | 2/2017 |

OTHER PUBLICATIONS

PCT International Search Report for PCT/EP2017/071512, dated May 4, 2018.
Sivakumar, et al., "Role of Protectants in Chemical Weed Management—A Review," Agric. Rev., (2002), vol. 23, No. 3: 194-201.
Taylor, et al., "Protective responses induced by herbicide safeners in wheat," Environmental and Experimental Botany, (2013), vol. 88: 93-99.

*Primary Examiner* — Trevor Love
(74) *Attorney, Agent, or Firm* — McBee Moore & Vanik IP, LLC

(57) ABSTRACT

The present invention relates to a method of reducing crop damage by treating the seed of the crop with the safener before sowing. This can be done in addition to the use of crop protection combinations/compositions, in particular herbicide/safener combinations and compositions comprising thereof, which are highly suitable to protect crops from herbicide damage in pre- and post-emergence treatments.

3 Claims, No Drawings

METHOD OF REDUCING CROP DAMAGE

CROSS-REFERENCE TO RELATED APPLICATIONS

This application is a National Stage entry of International Application No. PCT/EP2017/071512, filed Aug. 28, 2017, which claims priority to European Patent Application No. 16186376.6, filed Aug. 30, 2016, and European Patent Application No. 16205637.8, filed Dec. 21, 2016.

BACKGROUND

Field

The invention relates to a method of reducing crop damage by treating the seed of the crop with the safener before sowing. This can be done in addition to the use of crop protection combinations/compositions, in particular herbicide/safener combinations and compositions comprising thereof, which are highly suitable to protect crops from herbicide damage in pre- and post-emergence treatments.

Description of Related Art

It is already known that certain 3-isoxazolidinones, including 2-(2,4-dichlorophenyl)methyl-4,4-dimethyl-3-isoxazolidinone (compound I), show a selective herbicidal activity against grass or brassica crops (WO 2012/148689) and are especially effective in the control of difficult weeds or weeds showing herbicide resistance.

However, some herbicides or combinations thereof are not fully compatible with a number of important crop plants, such as, for example, various cereal species (such as wheat, triticale, barley, rye), sugar cane, sugar beet, soybeans, oilseed rape, corn, rice, potatoes, vegetables or cotton and cause crop damage. Accordingly, in some crops, they cannot be used in a way that ensures the desired broad herbicidal activity against harmful plants without causing damage to the crop.

Some agrochemicals can reduce crop damage when used in combination with herbicides. These compounds are referred to as safeners and are widely used in crop protection, particularly in the field of weed control during application of herbicides in crops. The mode of action of safeners is often not known in detail and their efficacy generally depends on the crop and on the specific herbicide to be combined with.

SUMMARY

It was an object of the present invention to provide a method for further reducing crop damage using known combinations of herbicides and safeners and compositions comprising thereof. Surprisingly, this object is achieved by the following methods/schemes of treatment:

Method A
Step 1: Treatment of the seed with a safener
Step 2: Applying 2-(2,4-dichlorophenyl)methyl-4,4-dimethyl-3-isoxazolidinone (compound I) or combinations/compositions comprising thereof in a post-emergence treatment Method B
Step 1: Treatment of the seed with a safener
Step 2: Applying 2-(2,4-dichlorophenyl)methyl-4,4-dimethyl-3-isoxazolidinone (compound I) or combinations/compositions comprising thereof in a pre-emergence treatment Method C
Step 1: Treatment of the seed with a safener
Step 2: Applying 2-(2,4-dichlorophenyl)methyl-4,4-dimethyl-3-isoxazolidinone (compound I) or combinations/compositions comprising thereof and a safener in a post-emergence treatment Method D
Step 1: Treatment of the seed with a safener
Step 2: Applying 2-(2,4-dichlorophenyl)methyl-4,4-dimethyl-3-isoxazolidinone (compound I) or combinations/compositions comprising thereof and a safener in a pre-emergence treatment

DETAILED DESCRIPTION OF A PREFERRED EMBODIMENT

Preferred are the following methods:

Method A-1
Step 1: Treatment of the seed with a safener from the group consisting of isoxadifen-ethyl, cyprosulfamide, mefenpyr-diethyl and cloquintocet-mexyl including its hydrates and salts (group I)
Step 2: Applying 2-(2,4-dichlorophenyl)methyl-4,4-dimethyl-3-isoxazolidinone (compound I) in a post-emergence treatment Method B-1
Step 1: Treatment of the seed with a safener from the group consisting of isoxadifen-ethyl, cyprosulfamide, mefenpyr-diethyl and cloquintocet-mexyl including its hydrates and salts (group I)
Step 2: Applying 2-(2,4-dichlorophenyl)methyl-4,4-dimethyl-3-isoxazolidinone (compound I) in a pre-emergence treatment Method C-1
Step 1: Treatment of the seed with a safener from the group consisting of isoxadifen-ethyl, cyprosulfamide, mefenpyr-diethyl and cloquintocet-mexyl including its hydrates and salts (group I)
Step 2: Applying 2-(2,4-dichlorophenyl)methyl-4,4-dimethyl-3-isoxazolidinone (compound I) and a safener from the group consisting of isoxadifen-ethyl, cyprosulfamide, mefenpyr-diethyl and cloquintocet-mexyl including its hydrates and salts (group I) in a post-emergence treatment.

Method D-1
Step 1: Treatment of the seed with a safener from the group consisting of isoxadifen-ethyl, cyprosulfamide, mefenpyr-diethyl and cloquintocet-mexyl including its hydrates and salts (group I)
Step 2: Applying 2-(2,4-dichlorophenyl)methyl-4,4-dimethyl-3-isoxazolidinone (compound I) and a safener from the group consisting of isoxadifen-ethyl, cyprosulfamide, mefenpyr-diethyl and cloquintocet-mexyl including its hydrates and salts (group I) in a pre-emergence treatment.

More preferred are the following methods:
Method A-2
Step 1: Treatment of the seed with mefenpyr-diethyl
Step 2: Applying 2-(2,4-dichlorophenyl)methyl-4,4-dimethyl-3-isoxazolidinone (compound I) in a post-emergence treatment Method B-2
Step 1: Treatment of the seed with mefenpyr-diethyl
Step 2: Applying 2-(2,4-dichlorophenyl)methyl-4,4-dimethyl-3-isoxazolidinone (compound I) in a pre-emergence treatment Method C-2

Step 1: Treatment of the seed with mefenpyr-diethyl

Step 2: Applying 2-(2,4-dichlorophenyl)methyl-4,4-dimethyl-3-isoxazolidinone (compound I) and mefenpyr-diethyl in a post-emergence treatment Method D-2

Step 1: Treatment of the seed with mefenpyr-diethyl

Step 2: Applying 2-(2,4-dichlorophenyl)methyl-4,4-dimethyl-3-isoxazolidinone (compound I) and mefenpyr-diethyl in a pre-emergence treatment Most preferred are the following methods:

Method A-3

Step 1: Treatment of the seed with mefenpyr-diethyl in an amount of 1 to 0.01 g/kg Step 2: Applying 2-(2,4-dichlorophenyl)methyl-4,4-dimethyl-3-isoxazolidinone (compound I) in a post-emergence treatment Method B-3

Step 1: Treatment of the seed with mefenpyr-diethyl in an amount of 1 to 0.01 g/kg Step 2: Applying 2-(2,4-dichlorophenyl)methyl-4,4-dimethyl-3-isoxazolidinone (compound I) in a pre-emergence treatment Method C-3

Step 1: Treatment of the seed with mefenpyr-diethyl in an amount of 1 to 0.01 g/kg.

Step 2: Applying 2-(2,4-dichlorophenyl)methyl-4,4-dimethyl-3-isoxazolidinone (compound I) and mefenpyr-diethyl in a post-emergence treatment Method D-3

Step 1: Treatment of the seed with mefenpyr-diethyl in an amount of 1 to 0.01 g/kg Step 2: Applying 2-(2,4-dichlorophenyl)methyl-4,4-dimethyl-3-isoxazolidinone (compound I) and mefenpyr-diethyl in a pre-emergence treatment Definitions Safener:

S1) Compounds of the group of heterocyclic carboxylic acid derivatives:

S1$^a$) Compounds of the type of dichlorophenylpyrazoline-3-carboxylic acid (S1$^a$), preferably compounds such as 1-(2,4-dichlorophenyl)-5-(ethoxycarbonyl)-5-methyl-2-pyrazoline-3-carboxylic acid, ethyl 1-(2,4-dichlorophenyl)-5-(ethoxycarbonyl)-5-methyl-2-pyrazoline-3-carboxylate (S1-1) ("mefenpyr(-diethyl)"), and related compounds, as described in WO-A-91/07874;

S1$^b$) Derivatives of dichlorophenylpyrazolecarboxylic acid (S1$^b$), preferably compounds such as ethyl 1-(2,4-dichlorophenyl)-5-methylpyrazole-3-carboxylate (S1-2), ethyl 1-(2,4-dichlorophenyl)-5-isopropylpyrazole-3-carboxylate (S1-3), ethyl 1-(2,4-dichlorophenyl)-5-(1,1-dimethylethyl)pyrazole-3-carboxylate (S1-4) and related compounds, as described in EP-A-333 131 and EP-A-269 806;

S1$^c$) Derivatives of 1,5-diphenylpyrazole-3-carboxylic acid) (S1$^c$), preferably compounds such as ethyl 1-(2,4-dichlorophenyl)-5-phenylpyrazole-3-carboxylate (S1-5), methyl 1-(2-chlorophenyl)-5-phenylpyrazole-3-carboxylate (S1-6) and related compounds, as described, for example, in EP-A-268554;

S1$^d$) Compounds of the type of thiazolecarboxylic acids (S1$^d$), preferably compounds such as fenchlorazole(-ethyl), i.e. ethyl 1-(2,4-dichlorophenyl)-5-trichloromethyl-(1H)-1,2,4-triazole-3-carboxylate (S1-7), and related compounds, as described in EP-A-174 562 and EP-A-346 620;

S1$^e$) Compounds of the type of 5-benzyl- or 5-phenyl-2-isoxazoline-3-carboxylic acid or 5,5-diphenyl-2-isoxazoline-3-carboxylic acid (Sic), preferably compounds such as ethyl 5-(2,4-dichlorobenzyl)-2-isoxazoline-3-carboxylate (S1-8) or ethyl 5-phenyl-2-isoxazoline-3-carboxylate (S1-9) and related compounds, as described in WO-A-91/08202, or 5,5-diphenyl-2-isoxazolinecarboxylic acid (S1-10) or ethyl 5,5-diphenyl-2-isoxazolinecarboxylate (S1-11) ("isoxadifen-ethyl") or n-propyl 5,5-diphenyl-2-isoxazolinecarboxylate (S1-12) or ethyl 5-(4-fluorophenyl)-5-phenyl-2-isoxazoline-3-carboxylate (S1-13), as described in the patent application WO-A-95/07897.

S2) Compounds of the group of 8-quinolinoxy derivatives (S2):

S2$^a$) Compounds of the type of 8-quinolinoxyacetic acid (S2$^a$), preferably 1-methylhexyl (5-chloro-8-quinolinoxy)acetate (common name "cloquintocet-mexyl" (S2-1), 1,3-dimethyl-but-1-yl (5-chloro-8-quinolinoxy)acetate (S2-2), 4-allyloxybutyl (5-chloro-8-quinolinoxy)acetate (S2-3), 1-allyloxyprop-2-yl (5-chloro-8-quinolinoxy)acetate (S2-4), ethyl (5-chloro-8-quinolinoxy)acetate (S2-5), methyl (5-chloro-8-quinolinoxy)acetate (S2-6), allyl (5-chloro-8-quinolinoxy)acetate (S2-7), 2-(2-propylideneiminoxy)-1-ethyl (5-chloro-8-quinolinoxy)acetate (S2-8), 2-oxo-prop-1-yl (5-chloro-8-quinolinoxy)acetate (S2-9) and related compounds, as described in EP-A-86 750, EP-A-94 349 and EP-A-191 736 or EP-A-0 492 366, and also (5-chloro-8-quinolinoxy)acetic acid (S2-10), its hydrates and salts, for example its lithium, sodium, potassium, calcium, magnesium, aluminium, iron, ammonium, quaternary ammonium, sulphonium or phosphonium salts, as described in WO-A-2002/34048;

S2$^b$) Compounds of the type of (5-chloro-8-quinolinoxy) malonic acid (S2$^b$), preferably compounds such as diethyl (5-chloro-8-quinolinoxy)malonate, diallyl (5-chloro-8-quinolinoxy)malonate, methyl ethyl (5-chloro-8-quinolinoxy)malonate and related compounds, as described in EP-A-0 582 198.

S3) Active compounds of the type of dichloroacetamides (S3) which are frequently used as pre-emergence safeners (soil-acting safeners), such as, for example, "dichlormid" (N,N-diallyl-2,2-dichloroacetamide) (S3-1), "R-29148" (3-dichloroacetyl-2,2,5-trimethyl-1,3-oxazolidine) (S3-2), "R-28725" (3-dichloroacetyl-2,2-dimethyl-1,3-oxazolidine) (S3-3), "benoxacor" (4-dichloroacetyl-3,4-dihydro-3-methyl-2H-1,4-benzoxazine) (S3-4), "PPG-1292" (N-allyl-N-[(1,3-dioxolan-2-yl)methyl]dichloroacetamide) (S3 5), "DKA-24" (N-allyl-N-[(allylaminocarbonyl)methyl]dichloroacetamide) (S3-6), "AD-67" or "MON 4660" (3-dichloroacetyl-1-oxa-3-azaspiro[4,5]decane) (S3-7), "TI-35" (1-dichloroacetylazepane) (S3-8) "diclonon" (dicyclonon) (S3-9) ((RS)-1-dichloroacetyl-3,3,8a-trimethylperhydropyrrolo[1,2-a]pyrimidin-6-one), furilazole" or "MON 13900" ((RS)-3-dichloroacetyl-5-(2-furyl)-2,2-dimethyloxazolidine) (S3-10), and also its (R)-isomer (S3-11).

S4) Compounds of the class of acylsulphonamides (S4):

S4$^a$) N-acylsulphonamides of the formula (S4$^a$) and salts thereof, as described in WO-A-97/45016

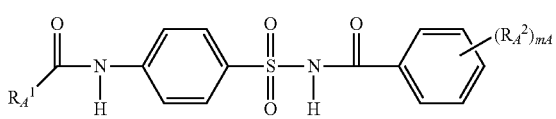
(S4$^a$)

in which $R_A^1$ is $(C_1-C_6)$-alkyl, $(C_3-C_6)$-cycloalkyl, where the 2 last-mentioned radicals are substituted by $v_A$ substituents from the group consisting of halogen, $(C_1-C_4)$-alkoxy, halo-$(C_1-C_6)$-alkoxy and $(C_1-C_4)$-alkylthio and, in the case of cyclic radicals, also $(C_1-C_4)$-alkyl and $(C_1-C_4)$-haloalkyl;

$R_A^2$ is halogen, $(C_1-C_4)$-alkyl, $(C_1-C_4)$-alkoxy, $CF_3$, $m_A$ is 1 or 2;

$v_A$ is 0, 1, 2 or 3;

S4$^b$) Compounds of the type of 4-(benzoylsulphamoyl) benzamides of the formula (S4$^b$) and salts thereof, as described in WO-A-99/16744,

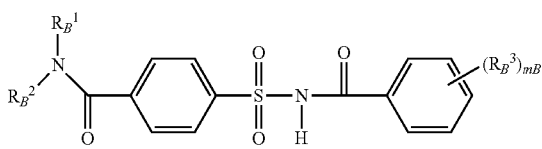
(S4$^b$)

in which $R_B^1$, $R_B^2$ independently of one another are hydrogen, $(C_1-C_6)$-alkyl, $(C_3-C_6)$-cycloalkyl, $(C_3-C_6)$-alkenyl, $(C_3-C_6)$-alkynyl, $R_B^3$ is halogen, $(C_1-C_4)$-alkyl, $(C_1-C_4)$-haloalkyl or $(C_1-C_4)$-alkoxy, $m_B$ is 1 or 2;

for example those in which $R_B^1$=cyclopropyl, $R_B^2$=hydrogen and $(R_B^3)$=2-OMe ("cyprosulfamide", S4-1), $R_B^1$=cyclopropyl, $R_B^2$=hydrogen and $(R_B^3)$=5-Cl-2-OMe (S4-2), $R_B^1$=ethyl, $R_B^2$=hydrogen and $(R_B^3)$=2-OMe (S4-3), $R_B^1$=isopropyl, $R_B^2$=hydrogen and $(R_B^3)$=5-Cl-2-OMe (S4-4) and $R_B^1$=isopropyl, $R_B^2$=hydrogen and $(R_B^3)$=2-OMe (S4-5);

S4$^c$) Compounds of the class of benzoylsulphamoylphenylureas of the formula (S4$^c$) as described in EP-A-365484,

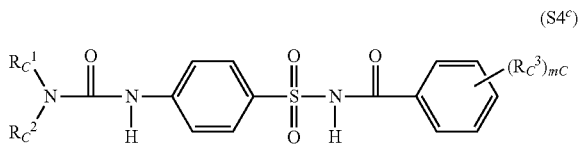
(S4$^c$)

in which $R_C^1$, $R_C^2$ independently of one another are hydrogen, $(C_1-C_8)$-alkyl, $(C_3-C_8)$-cycloalkyl, $(C_3-C_6)$-alkenyl, $(C_3-C_6)$-alkynyl, $R_C^3$ is halogen, $(C_1-C_4)$-alkyl, $(C_1-C_4)$-alkoxy, $CF_3$, mc is 1 or 2;

for example

1-[4-(N-2-methoxybenzoylsulphamoyl)phenyl]-3-methylurea,

1-[4-(N-2-methoxybenzoylsulphamoyl)phenyl]-3,3-dimethylurea,

1-[4-(N-4,5-dimethylbenzoylsulphamoyl)phenyl]-3-methylurea;

S4$^d$) Compounds of the type of N-phenylsulphonylterephthalamides of the formula (S4$^d$) and salts thereof, which are known, for example, from CN 101838227,

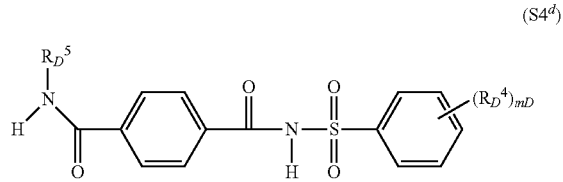
(S4$^d$)

in which $R_D^4$ is halogen, $(C_1-C_4)$-alkyl, $(C_1-C_4)$-alkoxy, $CF_3$;

$m_D$ is 1 or 2;

$R_D^5$ is hydrogen, $(C_1-C_6)$-alkyl, $(C_3-C_6)$-cycloalkyl, $(C_2-C_6)$-alkenyl, $(C_2-C_6)$-alkynyl, $(C_5-C_6)$-cycloalkenyl.

S5) Active compounds from the class of hydroxyaromatics and aromatic-aliphatic carboxylic acid derivatives (S5), for example ethyl 3,4,5-triacetoxybenzoate, 3,5-dimethoxy-4-hydroxybenzoic acid, 3,5-dihydroxybenzoic acid, 4-hydroxysalicylic acid, 4-fluorosalicyclic acid, 2-hydroxycinnamic acid, 2,4-dichlorocinnamic acid, as described in WO-A-2004/084631, WO-A-2005/015994, WO-A-2005/016001.

S6) Active compounds from the class of 1,2-dihydroquinoxalin-2-ones (S6), for example 1-methyl-3-(2-thienyl)-1,2-dihydroquinoxalin-2-one, 1-methyl-3-(2-thienyl)-1,2-dihydroquinoxaline-2-thione, 1-(2-aminoethyl)-3-(2-thienyl)-1,2-dihydroquinoxalin-2-one hydrochloride, 1-(2-methylsulphonylaminoethyl)-3-(2-thienyl)-1,2-dihydroquinoxalin-2-one, as described in WO-A-2005/112630.

S7) Compounds from the class of diphenylmethoxyacetic acid derivatives (S7), for example methyl diphenylmethoxyacetate (CAS-Reg. Nr. 41858-19-9) (S7-1), ethyl diphenylmethoxyacetate, or diphenylmethoxyacetic acid, as described in WO-A-98/38856.

S8) Compounds of the formula (S8), as described in WO-A-98/27049,

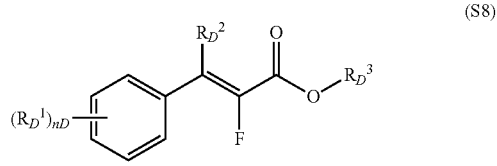
(S8)

where the symbols and indices have the following meanings:

$R_D^1$ is halogen, $(C_1-C_4)$-alkyl, $(C_1-C_4)$-haloalkyl, $(C_1-C_4)$-alkoxy, $(C_1-C_4)$-haloalkoxy, $R_D^2$ is hydrogen or $(C_1-C_4)$-alkyl, $R_D^3$ is hydrogen, $(C_1-C_8)$-alkyl, $(C_2-C_4)$-alkenyl, $(C_2-C_4)$-alkynyl or aryl, where each of the carbon-containing radicals mentioned above is unsubstituted or substituted by one or more, preferably by up to three, identical or different radicals from the group consisting of halogen and alkoxy; or salts thereof, $n_D$ is an integer from 0 to 2.

S9) Active compounds from the class of 3-(5-tetrazolylcarbonyl)-2-quinolones (S9), for example 1,2-dihydro-4-hydroxy-1-ethyl-3-(5-tetrazolylcarbonyl)-2-quinolone (CAS Reg. No.: 219479-18-2), 1,2-dihydro-4-hydroxy-1-methyl-3-(5-tetrazolylcarbonyl)-2-quinolone (CAS Reg. No.: 95855-00-8), as described in WO-A-1999/000020.

S10) Compounds of the formula (S10$^a$) or (S10$^b$) as described in WO-A-2007/023719 and WO-A-2007/023764

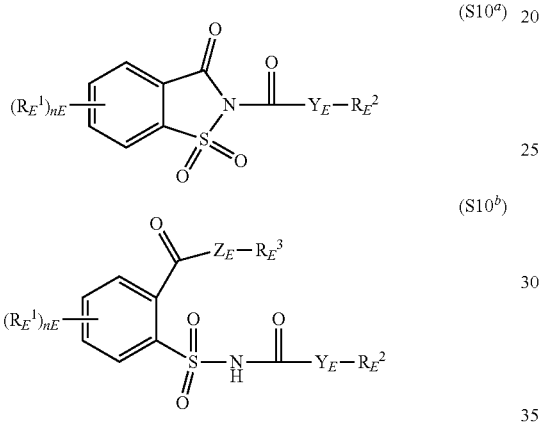

in which
$R_E^1$ is halogen, $(C_1-C_4)$-alkyl, methoxy, nitro, cyano, $CF_3$, $OCF_3$
$Y_E$, $Z_E$ independently of one another are O or S,
$n_E$ is an integer from 0 to 4,
$R_E^2$ is $(C_1-C_{16})$-alkyl, $(C_2-C_6)$-alkenyl, $(C_3-C_6)$-cycloalkyl, aryl; benzyl, halobenzyl,
$R_E^3$ is hydrogen or $(C_1-C_6)$-alkyl.

S11) Active compounds of the type of oxyimino compounds (S11), which are known as seed dressings, such as, for example, "oxabetrinil" ((Z)-1,3-dioxolan-2-ylmethoxyimino(phenyl)acetonitrile) (S11-1), which is known as seed dressing safener for millet against metolachlor damage,
"fluxofenim" (1-(4-chlorophenyl)-2,2,2-trifluoro-1-ethanone 0-(1,3-dioxolan-2-ylmethyl)oxime) (S11-2), which is known as seed dressing safener for millet against metolachlor damage, and
"cyometrinil" or "CGA-43089" ((Z)-cyanomethoxyimino(phenyl)acetonitrile) (S11-3), which is known as seed dressing safener for millet against metolachlor damage.

S12) Active compounds from the class of isothiochromanones (S12), such as, for example, methyl [(3-oxo-1H-2-benzothiopyran-4 (3H)-ylidene)methoxy]acetate (CAS Reg. No.: 205121-04-6) (S12-1) and related compounds from WO-A-1998/13361.

S13) One or more compounds from group (S13):
"naphthalic anhydrid" (1,8-naphthalenedicarboxylic anhydride) (S13-1), which is known as seed dressing safener for corn against thiocarbamate herbicide damage, "fenclorim" (4,6-dichloro-2-phenylpyrimidine) (S13-2), which is known as safener for pretilachlor in sown rice,
"flurazole" (benzyl 2-chloro-4-trifluoromethyl-1,3-thiazole-5-carboxylate) (S13-3), which is known as seed dressing safener for millet against alachlor and metolachlor damage,
"CL 304415" (CAS Reg. No.: 31541-57-8) (4-carboxy-3,4-dihydro-2H-1-benzopyran-4-acetic acid) (S13-4) from American Cyanamid, which is known as safener for corn against imidazolinone damage,
"MG 191" (CAS Reg. No.: 96420-72-3) (2-dichloromethyl-2-methyl-1,3-dioxolane) (S13-5) which is known as safener for corn,
"MG 838" (CAS Reg. No.: 133993-74-5) (2-propenyl 1-oxa-4-azaspiro[4.5]decane-4-carbodithioate) (S13-6),
"disulphoton" (0,0-diethyl S-2-ethylthioethyl phosphorodithioate) (S13-7),
"dietholate" (0,0-diethyl 0-phenyl phosphorothioate) (S13-8),
"mephenate" (4-chlorophenyl methylcarbamate) (S13-9).

S14) Active compounds which, besides a herbicidal effect against harmful plants, also have a safener effect on crop plants such as rice, such as, for example, "dimepiperate" or "MY 93" (S-1-methyl-1-phenylethyl piperidine-1-carbothioate), which is known as safener for rice against molinate herbicide damage,
"daimuron" or "SK 23" (1-(1-methyl-1-phenylethyl)-3-p-tolylurea), which is known as safener for rice against imazosulphuron herbicide damage,
"cumyluron"="JC 940" (3-(2-chlorophenylmethyl)-1-(1-methyl-1-phenylethyl)urea, see JP-A-60087254), which is known as safener for rice against some herbicide damage,
"methoxyphenone" or "NK 049" (3,3'-dimethyl-4-methoxybenzophenone), which is known as safener for rice against some herbicide damage,
"CSB" (1-bromo-4-(chloromethylsulphonyl)benzene) from Kumiai (CAS Reg. No. 54091-06-4), which is known as safener against some herbicide damage in rice.

S15) Compounds of the formula (S15) or its tautomers,

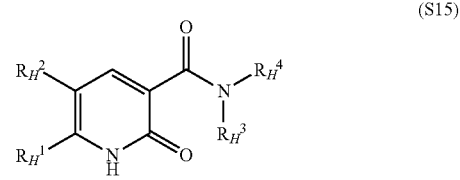

as described in WO-A-2008/131861 and WO-A-2008/131860, in which
$R_H^1$ is $(C_1-C_6)$-haloalkyl,
$R_H^2$ is hydrogen or halogen,
$R_H^3$, $R_H^4$ independently of one another are hydrogen, $(C_1-C_{16})$-alkyl, $(C_2-C_{16})$-alkenyl or $(C_2-C_{16})$-alkynyl,
where each of the 3 last-mentioned radicals is unsubstituted or substituted by one or more radicals from the group consisting of halogen, hydroxy, cyano, $(C_1-C_4)$-alkoxy, haloalkoxy, $(C_1-C_4)$-alkylthio, $(C_1-C_4)$-alkylamino, di-[$(C_1-C_4)$-alkyl]-amino, [$(C_1-C_4)$-alkoxy]-carbonyl, [$(C_1-C_4)$-haloalkoxy]-carbonyl, unsubstituted or substituted $(C_3-C_6)$-cycloalkyl, unsubstituted or substituted phenyl, and unsubstituted or substituted heterocyclyl;

or $(C_3-C_6)$-cycloalkyl, $(C_4-C_6)$-cycloalkenyl, $(C_3-C_6)$-cycloalkyl which is at one site of the ring condensed with a 4 to 6-membered saturated or unsaturated carbocyclic ring, or $(C_4-C_6)$-cycloalkenyl which is at one site of the ring condensed with a 4 to 6-membered saturated or unsaturated carbocyclic ring, where each of the 4 last-mentioned radicals is unsubstituted or substituted by one or more radicals from the group consisting of halogen, hydroxy, cyano, $(C_1-C_4)$-alkyl, $(C_1-C_4)$-haloalkyl, $(C_1-C_4)$-alkoxy, $(C_1-C_4)$-haloalkoxy, $(C_1-C_4)$-alkylthio, $(C_1-C_4)$-alkylamino, di-$(C_1-C_4)$-alkyl]-amino, $[(C_1-C_4)$-alkoxy]-carbonyl, $[(C_1-C_4)$-haloalkoxy]-carbonyl, unsubstituted or substituted $(C_3-C_6)$-cycloalkyl, unsubstituted or substituted phenyl, and unsubstituted or substituted heterocyclyl; or $R_H^3$ is $(C_1-C_4)$-alkoxy, $(C_2-C_4)$-alkenyloxy, $(C_2-C_6)$-alkynyloxy or $(C_2-C_4)$-haloalkoxy, and $R_H^4$ is hydrogen or $(C_1-C_4)$-alkyl, or $R_H^3$ and $R_H^4$ together with the directly bound N-atom are a 4 to 8-membered heterocyclic ring, which can contain further hetero ring atoms besides the N-atom, preferably up to two further hetero ring atoms from the group consisting of N, O and S, and which is unsubstituted or substituted by one or more radicals from the group consisting of halogen, cyano, nitro, $(C_1-C_4)$-alkyl, $(C_1-C_4)$-haloalkyl, $(C_1-C_4)$-alkoxy, $(C_1-C_4)$-haloalkoxy, and $(C_1-C_4)$-alkylthio.

Preferred safener are:

Isoxadifen-ethyl, cyprosulfamide, mefenpyr-diethyl and cloquintocet-mexyl including its hydrates and salts, for example its lithium, sodium, potassium, calcium, magnesium, aluminium, iron, ammonium, quaternary ammonium, sulphonium or phosphonium salts (group I).

Seed:

Seed of crop plants, such as, for example, various cereal species (such as wheat, triticale, barley, rye), sugar cane, sugar beet, soybeans, oilseed rape, corn, potatoes, vegetables, rice or cotton.

Preferred is the seed of the following crop plants: wheat, triticale, barley, rye corn, rice.

Combinations:

Combinations according to the invention are: 2-(2,4-dichlorophenyl)methyl-4,4-dimethyl-3-isoxazolidinone (compound I) and at least one or more herbicides from the group consisting of: aclonifen, bromoxynil, bromoxynilbutyrate, -potassium, -heptanoate, and -octanoate, benzofenap, butachlor, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, bicyclopyrone, cinmethylin, diflufenican, dimethenamid, ethoxy sulfuron, fenoxaprop, fenoxaprop-P, fenoxaprop-ethyl, fenoxaprop-P-ethyl, fenquinotrione, fentrazamide, florasulam, florpyrauxifen-benzyl, flufenacet, fluroxypyr, fluroxypyr-meptyl, foramsulfuron, iodosulfuron, iodosulfuron-methyl-sodium, isoproturon, isoxaflutole, lancotrione, mefenacet, mesosulfuron, mesosulfuron-methyl, metolachlor, S-metolachlor, metribuzin, metosulam, nicosulfuron, oxadiargyl, oxadiazon, pethoxamid, prosulfocarb, pyrasulfotole, pyroxasulfone, pyroxsulam, tefuryltrione, tembotrione, thiencarbazone, thiencarbazone-methyl, tolpyralate, and triafamone, pendimethalin, propoxycarbazone, halauxifen-methyl, 2-methyl-4-chlorophenoxyacetic acid (group II).

Composition

Compositions within the context of the present invention comprise in addition to the combinations according to the invention one or more further component(s) selected from the group consisting of formulation auxiliaries, additives customary in crop protection, and further agrochemically active compounds.

Additives

Additives are for example, fertilizers and colorants.

Agrochemically Active Compounds

Agrochemically active compounds are for example fungicides and insecticides.

Preferred among the agrochemically active compounds are prothioconazole, tebuconazole, fluoxastrobin, difenoconazole, penflufen, fluopicolide, fludioxonil, thiodicarb, triticonazole, prochloraz, fluxapyroxad, thiodicarb, imidacloprid, clothianidin, flupyradifurone, picarbutrazox, mefenoxam, flonicamid, ipconazole, diniconazole, metconazole, sithiofam, pyraclostrobin, carboxin, sedaxane, thiamethoxam, tefluthrin, cypermethrin, metalaxyl, N-(5-chloro-2-isopropylbenzyl)-N-cy clopropyl-3-(difluoromethyl)-5-fluoro-1-methyl-1H-pyrazole-4-carboxamide, *Bacillus subtilis* and *Bacillus firmus*.

Especially preferred among the agrochemically active compounds are prothioconazole, tebuconazole, difenoconazole, fludioxonil, triticonazole, imidacloprid, clothianidin, ipconazole, sithiofam, sedaxane, thiamethoxam, metalaxyl and N-(5-chloro-2-isopropylbenzyl)-N-cy clopropyl-3-(difluoromethyl)-5-fluoro-1-methyl-1H-pyrazole-4-carboxamide.

The use of compound I or of the combinations/compositions according to the invention provides for excellent herbicidal effectiveness against a broad spectrum of economically important mono- and dicotyledonous annual weeds and perennial weeds.

The present invention therefore provides a method of controlling undesired plants or for regulating the growth of plants, preferably in plant crops, in which the compound I or the combinations/compositions according to the invention are applied to the plants (e.g. mono- or dicotyledonous weeds or undesired crop plants) or the area on which the plants grow. The compound I or the combinations/compositions according to the invention can be applied at different growth stages (GS) of the plant allowing broadening of the applicability of the compound I or the combinations/compositions according to the invention, and providing for an efficient method of controlling undesired weeds or plants at different growth stages. Examples of mono- and dicotyledonous weed flora which can be controlled by the compound I or the combinations/compositions according to the invention, without a limitation to certain species being intended through the naming, are:

Monocotyledonous weeds of the genera: *Aegilops, Agropyron, Agrostis, Alopecurus, Apera, Avena, Brachiaria, Bromus, Cenchrus, Commelina, Cynodon, Cyperus, Dactyloctenium, Digitaria, Echinochloa, Eleocharis, Eleusine, Eragrostis, Eriochloa, Festuca, Fimbristylis, Heteranthera, Imperata, Ischaemum, Leptochloa, Lolium, Monochoria, Panicum, Paspalum, Phalaris, Phleum, Poa, Rottboellia, Sagittaria, Scirpus, Setaria*, and *Sorghum*.

Dicotyledonous weeds of the genera: *Abutilon, Amaranthus, Ambrosia, Anoda, Anthemis, Aphanes, Artemisia, Atriplex, Bellis, Bidens, Capsella, Carduus, Cassia, Centaurea, Chenopodium, Cirsium, Convolvulus, Datura, Desmodium, Emex, Erysimum, Euphorbia, Galeopsis, Galinsoga, Galium, Hibiscus, Ipomoea, Kochia, Lamium, Lepidium, Lindernia, Matricaria, Mentha, Mercurialis, Mullugo, Myo-* sotis, Papaver, Pharbitis, Plantago, Polygonum, Portulaca, Ranunculus, Raphanus, Rorippa, Rotala, Rumex, Salsola, Senecio, Sesbania, Sida, Sinapis, Solanum, Sonchus, Sphenoclea, Stellaria, Taraxacum, Thlaspi, Trifolium, Urtica, Veronica, Viola, and Xanthium.

Pre-emergence treatment: If the compound I or the combinations/compositions according to the invention are applied to the soil's surface prior to weed emergence, then either the weed seedlings are prevented completely from emerging, or the weeds grow to seedling stage, but then their growth stops and finally, after three to four weeks, they die completely.

For the use as post-emergence application of the compound I or the combinations/compositions according to the invention to the green parts of the plants, weed growth is likewise inhibited following treatment, or they die completely after a certain time, so that in this manner competition by the weeds, which is harmful to the crop plants, is eliminated very early on and in a lasting manner The compound I or combinations/compositions according to the invention can thus effectively be applied as pre- or post-emergence application for controlling undesired weed plant growth, preferably in crops such as cereals, maize, and rice. Combinations/compositions according to the invention comprising the safener Isoxadifen-ethyl can preferably be applied as post-emergence application in maize and rice; combinations/compositions according to the invention comprising the safener Mefenpyr-diethyl can preferably be applied as post-emergence application in cereals, naming without limitation wheat, rye, triticale, barley; and combinations/compositions according to the invention comprising the safener Cyprosulfamide or Isoxadifen-ethyl can preferably be applied as post-emergence application in maize.

The method according to the invention can also be used for controlling harmful weeds in crops of genetically modified plants or in crops of plants being modified by conventional mutagenesis. As a rule, the transgenic plants are distinguished by particularly advantageous properties, for example by resistances to certain pesticides, primarily certain herbicides, resistances to plant diseases/pathogens or insects or microorganisms such as fungi, bacteria or viruses. Other particular properties relate, for example, to the harvested material with respect to quantity, quality, storability, composition and specific ingredients.

Combinations or compositions according to the invention can be produced by known methods, for example as mixed formulations of the individual components, optionally with further active ingredients, adjuvants and/or customary formulation assistants.

In the combinations or compositions of the invention, the application rate of compound I is customarily 10 to 1000 g of active ingredient (a. i.) per hectare, preferably 50 to 600 g a. i./ha, especially preferably 100 to 400 g a. i./ha. The application rate of the further active ingredient of group II is customarily 1 to 3000 g of active ingredient per hectare, preferably 2,5 to 2500 g a. i./ha, especially preferably 4 to 1000 g a. i./ha. However, the weight ratios of individual components can be varied within relatively wide ranges. Generally speaking, there are 1:240 to 200:1 parts by weight, preferably 1:40 to 50:1 parts by weight, especially preferably 1:10 to 40:1 of component I per part by weight of component of group II.

In step 1 the seed is treated with a safener. The amount ranges from 1 to 0.01 g/kg, preferably from 1 to 0.1 g/kg, most preferably from 0.75 to 0.25 g/kg. The sowing density varies from 75 to 150 kg seeds/ha (depending on the variety and the sowing date).

Considering the lowest sowing density of 75 kg/ha, 0.75 to 75 g safener/ha are applied to the field when sowing the seeds prepared in step 1.

Considering the highest sowing density of 150 kg/ha, 1.5 to 150 g safener/ha are applied to the field when sowing the seeds prepared in step 1.

For method C/C-1/C-2/C-3 and D/D-1/D-2/D-3 in step 2 the application rate of safener is 1 to 1000 g safener/ha, preferably 5 to 500 g safener/ha, most preferably 50 to 350 g safener/ha.

EXAMPLES

1. Method as Used in the Prior Art

Wheat seeds (winter wheat, TRZAW) were placed in sandy loam soil in pots of a diameter of 7 cm, covered with soil and cultivated in a greenhouse under good growth conditions.

Post-emergence application was done when the plants had reached growth stage BBCH11 (BBCH is the international coding system for the growth stage of crops and weeds).

The herbicide (Compound I) was formulated as suspension concentrate (SC).

The safener (mefenpyr-diethyl) was formulated as wettable powder (WP).

The compounds were sprayed onto the green parts of the plants as an aqueous suspension at an equivalent water application rate of 300 l/ha with addition of 0.2% wetting agent (Agrotin).

The combination of herbicide and safener was applied as a tank mix.

After application, the test plants were kept in the greenhouse under good growth conditions. 20 days after application, % growth depression and % chlorosis observed on the treated plants were scored visually in comparison to untreated controls.

Values in the table below are mean values from at least 3 replicates.

| Treatment | Herbicide dosage (g/ha) | Safener dosage in tank mix (g/ha) | Safener dosage in seed treatment (g/kg) | % growth depression | % chlorosis |
|---|---|---|---|---|---|
| Herbicide post-em. | 300 | — | — | 40 | 40 |
| Herbicide post-em. + Safener in tank mix | 300 | 200 | — | 20 | 2 |

2. Method A

Wheat seeds (winter wheat, TRZAW) were placed in sandy loam soil in pots of a diameter of 7 cm, covered with soil and cultivated in a greenhouse under good growth conditions.

For the safener seed treatment, sufficient seeds were weighed into screw top glass bottles approximately twice the volume of the seeds.

The safener (mefenpyr-diethyl, formulated as wettable powder; WP) was weighed out so that the required rates (g a.i./kg seed) would be obtained, dissolved in water (1 ml water per 10 g of seeds), and added to the seeds to produce a slurry.

The bottles were capped and then placed in an overhead shaker (set at medium speed for up to 1 hour) so that the seeds were evenly coated with the slurry. The bottles were uncapped and the seeds were sown as described above.

Post-emergence application of the herbicide was done when the plants had reached growth stage BBCH11.

The herbicide (Compound 1) was formulated as suspension concentrate (SC) and was sprayed onto the green parts of the plants as an aqueous suspension at an equivalent water application rate of 300 l/ha with addition of 0.2% wetting agent (agrotin).

After application, the test plants were kept in the greenhouse under good growth conditions. 20 days after application, % growth depression and % chlorosis observed on the treated plants were scored visually in comparison to untreated controls.

Values in the table below are mean values from at least 3 replicates.

| Treatment | Herbicide dosage (g/ha) | Safener dosage in tank mix (g/ha) | Safener dosage in seed treatment (g/kg) | % growth depression | % chlorosis |
|---|---|---|---|---|---|
| Herbicide post-em. | 300 | — | — | 40 | 40 |
| Safener seed treatment + Herbicide post-em. | 300 | — | 0.5 | 23 | 13 |

3. Method C

Wheat seeds (winter wheat, TRZAW) were placed in sandy loam soil in pots of a diameter of 7 cm, covered with soil and cultivated in a greenhouse under good growth conditions.

For the safener seed treatment, sufficient seeds were weighed into screw top glass bottles approximately twice the volume of the seeds.

The safener (mefenpyr-diethyl, formulated as wettable powder; WP) was weighed out so that the required rates (g a.i./kg seed) would be obtained, dissolved in water (1 ml water per 10 g of seeds), and added to the seeds to produce a slurry.

The bottles were capped and then placed in an overhead shaker (set at medium speed for up to 1 hour) so that the seeds were evenly coated with the slurry. The bottles were uncapped and the seeds were sown as described above.

Post-emergence application was done when the plants had reached growth stage BBCH11.

The herbicide (Compound I) was formulated as suspension concentrate (SC).

The safener (mefenpyr-diethyl) was formulated as wettable powder (WP).

The compounds were sprayed onto the green parts of the plants as an aqueous suspension at an equivalent water application rate of 300 l/ha with addition of 0.2% wetting agent (Agrotin).

The combination of herbicide and safener was applied as a tank mix.

After application, the test plants were kept in the greenhouse under good growth conditions. 20 days after application, % growth depression and % chlorosis observed on the treated plants were scored visually in comparison to untreated controls.

Values in the table below are mean values from at least 3 replicates.

| Treatment | Herbicide dosage (g/ha) | Safener dosage in tank mix (g/ha) | Safener dosage in seed treatment (g/kg) | % growth depression | % chlorosis |
|---|---|---|---|---|---|
| Herbicide post-em. | 300 | — | — | 40 | 40 |
| Safener seed treatment + Herbicide post-em. + Safener in tank mix | 300 | 200 | 0.5 | 3 | 2 |

4. Method D

Wheat seeds (winter wheat, TRZAW) were placed in sandy loam soil in pots of a diameter of 7 cm, covered with soil and cultivated in a greenhouse under good growth conditions.

For the safener seed treatment, sufficient seeds were weighed into screw top glass bottles approximately twice the volume of the seeds.

The safener (mefenpyr-diethyl, formulated as wettable powder; WP) was weighed out so that the required rates (g a.i./kg seed) would be obtained, dissolved in water (1 ml water per 10 g of seeds), and added to the seeds to produce a slurry.

The bottles were capped and then placed in an overhead shaker (set at medium speed for up to 1 hour) so that the seeds were evenly coated with the slurry. The bottles were uncapped and the seeds were sown as described above.

For the pre-emergence application, the herbicide (Compound I) was formulated as suspension concentrate (SC), the safener (mefenpyr-diethyl) was formulated as wettable powder (WP).

The compounds were sprayed to the soil surface as an aqueous suspension at an equivalent water application rate of 300 l/ha with addition of 0.2% wetting agent (Agrotin).

The combination of herbicide and safener was applied as a tank mix.

After application, the test plants were kept in the greenhouse under good growth conditions. 21 days after application, % growth depression and % chlorosis observed on the treated plants were scored visually in comparison to untreated controls.

Values in the table below are mean values from at least 3 replicates.

| Treatment | Herbicide dosage (g/ha) | Safener dosage in tank mix (g/ha) | Safener dosage in seed treatment (g/kg) | % growth depression | % chlorosis |
|---|---|---|---|---|---|
| Herbicide post-em. | 300 | — | — | 27 | 17 |
| Safener seed treatment + Herbicide pre-em. + Safener in tank mix | 300 | 200 | 0.5 | 17 | 0 |

The invention claimed is:

1. Method of reducing crop damage comprising treating seed of the crop with mefenpyr-diethyl in a range from 0.25 to 0.75 g/kg before sowing (1) and applying 2-(2,4-dichlorophenyl)methyl-4,4-dimethyl-3-isoxazolidinone (compound I) in a range of from 300 to 400 g/ha or combinations/compositions comprising thereof and mefenpyr-diethyl in a range from 50 to 350 q/ha in a post-emergence treatment (2).

2. Method according to claim 1 wherein the composition in (2) comprises in addition to compound I at least one further herbicide selected from the group consisting of: aclonifen, bromoxynil, bromoxynil-butyrate, potassium, -heptanoate, and -octanoate, benzofenap, butachlor, 2,4-D, 2,4-D-butotyl, -butyl, -dimethylammonium, -diolamin, -ethyl, -2-ethylhexyl, isobutyl, -isooctyl, -iso-propyl-ammonium, -potassium, -triisopropanolammonium, and -trolamine, bicyclopyrone, cinmethylin, diflufenican, dimethenamid, ethoxysulfuron, fenoxaprop, fenoxaprop-P, fenoxaprop-ethyl, fenoxaprop-P-ethyl, fenquinotrione, fentrazamide, florasulam, florpyrauxifen-benzyl, flufenacet, fluroxypyr, fluroxypyr-meptyl, foramsulfuron, iodosulfuron, iodosulfuron-methyl-sodium, isoproturon, isoxaflutole, lancotrione, mefenacet, mesosulfuron, mesosulfuron-methyl, metolachlor, S-metola-chlor, metribuzin, metosulam, nicosulfuron, oxadiargyl, oxadiazon, pethoxamid, prosulfocarb, pyrasulfotole, pyroxasulfone, pyroxsulam, tefuryltrione, tembotrione, thiencarbazone, thiencarbazone-methyl, tolpyralte and triafamone, pendimethalin, propoxycarbazone, halauxifen-methyl, 2-methyl-4-chlorophenoxyacetic acid (group II).

3. Method according to claim 1 wherein the crop is a genetically modified plant.

\* \* \* \* \*